United States Patent
Simmons, Jr. et al.

[11] Patent Number: 6,132,842
[45] Date of Patent: Oct. 17, 2000

[54] CUSHIONING PRODUCT

[75] Inventors: James A. Simmons, Jr., Painesville Township, Ohio; Edwin P. Beierlorzer, Bellevue, Wash.

[73] Assignee: Ranpak Corp., Concord Township, Ohio

[21] Appl. No.: 09/039,861

[22] Filed: Mar. 16, 1998

Related U.S. Application Data

[63] Continuation-in-part of application No. 08/487,012, Jun. 7, 1995, Pat. No. 5,755,656, and a continuation-in-part of application No. 08/482,648, Jun. 7, 1995, Pat. No. 5,785,639, said application No. 08/482,648, is a continuation of application No. 08/482,649, Jun. 7, 1995, Pat. No. 5,643,167, which is a continuation of application No. PCT/US95/04113, Apr. 3, 1995, which is a continuation-in-part of application No. 08/221,624, Apr. 1, 1994, Pat. No. 5,791,483.

[51] Int. Cl.⁷ .................................................. B65D 81/02
[52] U.S. Cl. ..................... 428/132; 428/34.2; 428/34.3; 428/124; 428/156; 428/153; 428/154; 428/126; 428/127; 493/227; 493/233; 493/967; 206/584; 206/586; 206/814; 138/166
[58] Field of Search ..................... 428/132, 34.2, 428/34.3, 124, 156, 153, 154, 126, 127; 493/227, 233, 967; 206/584, 586, 814; 138/166

[56] References Cited

U.S. PATENT DOCUMENTS

| | | | |
|---|---|---|---|
| 1,723,255 | 8/1929 | Rowe | 383/113 |
| 1,723,355 | 8/1929 | Kirschbraun | 162/171 |
| 1,918,149 | 7/1933 | Sullivan | 428/132 |
| 1,989,794 | 2/1935 | Duvall | 428/102 |
| 2,106,246 | 1/1938 | Fourness | 428/154 |
| 2,273,162 | 2/1942 | Willard | 270/52.11 |
| 2,425,123 | 8/1947 | Quayle et al. | 242/521 |
| 2,663,072 | 12/1953 | Pfistershammer | 29/521 |
| 2,721,709 | 10/1955 | Auerbacher | 242/560.1 |
| 2,882,802 | 4/1959 | Walker | 493/45 |
| 2,935,002 | 5/1960 | Robinson, Jr. | 493/363 |
| 3,238,852 | 3/1966 | Schur et al. | 493/45 |
| 3,256,673 | 6/1966 | Tew et al. | 53/557 |
| 3,323,983 | 6/1967 | Palmer et al. | 162/362 |
| 3,325,120 | 6/1967 | Brinkman | 242/557 |
| 3,333,757 | 8/1967 | Strauss | 206/521 |
| 3,377,224 | 4/1968 | Gresham et al. | 156/209 |
| 3,509,797 | 5/1970 | Johnson | 493/340 |
| 3,509,798 | 5/1970 | Johnson | 493/407 |
| 3,518,147 | 6/1970 | Harmsen | 156/252 |
| 3,546,742 | 12/1970 | Kugler | 425/196 |
| 3,559,866 | 2/1971 | Olson, Sr. | 229/14 |
| 3,603,216 | 9/1971 | Johnson | 93/1 WZ |
| 3,606,726 | 9/1971 | Spertus et al. | 93/1 WZ |
| 3,613,522 | 10/1971 | Johnson | 161/47 |
| 3,650,877 | 3/1972 | Johnson | 161/104 |
| 3,655,500 | 4/1972 | Johnson | 428/126 |
| 3,703,432 | 11/1972 | Koski | 428/132 |

(List continued on next page.)

FOREIGN PATENT DOCUMENTS 0 523 382 A2  6/1992  European Pat. Off. .

*Primary Examiner*—William P. Watkins, III
*Attorney, Agent, or Firm*—Renner, Otto, Boisselle & Sklar, LLP

[57] ABSTRACT

A cushioning product having plural layers of a sheet-like stock material folded upon themselves to form a pillow-like portion. The lateral edges of the outer layer of the stock material are overlapped and connected together to maintain the geometry of the pillow-like portion. The lateral edges of the outer layers are connected together (for example, they are mechanically interlocked) separate from the central portion of the outer layer. The overlapped edges of the outer layer may form a tab portion projecting from the pillow-like portion. Alternatively, the overlapped lateral edges of the outer layer may be generally coplanar with adjacent unoverlapped portions of the outer layer. Preferably, the stock material comprises layers of paper, more preferably biodegradable, recyclable and reusable paper, and even more preferably Kraft paper.

31 Claims, 1 Drawing Sheet

U.S. PATENT DOCUMENTS

| | | | |
|---|---|---|---|
| 3,779,039 | 12/1973 | Schultenkamper | 64/17 |
| 3,789,757 | 2/1974 | Motter et al. | 101/153 |
| 3,899,166 | 8/1975 | Behn | 270/83 |
| 4,026,198 | 5/1977 | Ottaviano | 93/1 WZ |
| 4,085,662 | 4/1978 | Ottaviano | 93/1 WZ |
| 4,109,040 | 8/1978 | Ottaviano | 428/129 |
| 4,237,776 | 12/1980 | Ottaviano | 93/1 WZ |
| 4,557,716 | 12/1985 | Ottaviano | 493/464 |
| 4,650,456 | 3/1987 | Armington | 493/464 |
| 4,717,613 | 1/1988 | Ottaviano | 428/129 |
| 4,750,896 | 6/1988 | Komaransky et al. | 493/357 |
| 4,839,210 | 6/1989 | Komaransky et al. | 428/77 |
| 4,884,999 | 12/1989 | Baldacci | 493/439 |
| 4,937,131 | 6/1990 | Baldacci et al. | 428/131 |
| 4,968,291 | 11/1990 | Baldacci et al. | 493/354 |
| 5,061,543 | 10/1991 | Baldacci et al. | 428/126 |
| 5,088,972 | 2/1992 | Parker | 493/365 |
| 5,117,720 | 6/1992 | Bussi | 83/660 |
| 5,123,889 | 6/1992 | Armington et al. | 493/352 |
| 5,129,297 | 7/1992 | Bussi | 83/30 |
| 5,134,013 | 7/1992 | Parker | 428/182 |
| 5,173,352 | 12/1992 | Parker | 428/174 |
| 5,188,581 | 2/1993 | Baldacci | 493/381 |
| 5,194,315 | 3/1993 | Itoh | 428/178 |
| 5,211,620 | 5/1993 | Ratzel et al. | 493/346 |
| 5,322,477 | 6/1994 | Armington et al. | 493/346 |
| 5,330,819 | 7/1994 | Krueger | 428/102 |
| 5,340,638 | 8/1994 | Sperner | 428/182 |
| 5,382,190 | 1/1995 | Graves | 53/463 |
| 5,387,173 | 2/1995 | Simmons, Jr. | 493/407 |
| 5,471,783 | 12/1995 | McLean | 47/30 |

CUSHIONING PRODUCT

RELATED APPLICATIONS

This application is a continuation-in-part of U.S. patent application Ser. No. 08/487,012 of Edwin P. Bierlorzer, filed on Jun. 7, 1995 now U.S. Pat. No. 5,755,656 and entitled CUSHIONING CONVERSION MACHINE FOR CONVERTING SHEET-LIKE STOCK MATERIAL INTO A CUSHIONING PRODUCT and this application is also a continuation-in-part of U.S. patent application Ser. No. 08/482,648 to James A. Simmons, filed on Jun. 7, 1995 now U.S. Pat. No. 5,785,639 and entitled CUSHIONING CONVERSION MACHINE FOR CONVERTING A SHEET-LIKE STOCK MATERIAL INTO A CUSHIONING PRODUCT said Ser. No. 08/482,648 is a continuation of U.S. application Ser. No. 08/482,649, filed Jun. 7, 1995, now U.S. Pat. No. 5,643,167 which is a continuation of International Application No. PCT/US95/04113 filed on Apr. 3, 1995, which is continuation-in-part of U.S. patent application Ser. No. 08/221,624 filed Apr. 1, 1994 now U.S. Pat. No. 5,791,483. The entire disclosures of these earlier applications are hereby incorporated by reference.

BACKGROUND OF THE INVENTION

In the process of shipping an item from one location to another, a protective packaging material is typically placed in the shipping case, or box, to fill any voids and/or to cushion the item during the shipping process. Some conventional protective packaging materials are plastic foam peanuts and plastic bubble pack. While these conventional plastic materials seem to adequately perform as cushioning products, they are not without disadvantages. Perhaps the most serious drawback of plastic bubble wrap and/or plastic foam peanuts is their effect on our environment. Quite simply, these plastic packaging materials are not biodegradable and thus they cannot avoid further multiplying our planet's already critical waste disposal problems. The non-biodegradability of these packaging materials has become increasingly important in light of many industries adopting more progressive policies in terms of environmental responsibility.

The foregoing and other disadvantages of conventional plastic packaging materials have made paper protective packaging material a very popular alternative. Paper is biodegradable, recyclable and renewable, making it an environmentally responsible choice for conscientious industries.

While paper in sheet form could possibly be used as a protective packaging material, it is usually preferable to convert the sheets of paper into a relatively low density pad-like cushioning dunnage product. This conversion may be accomplished by a cushioning conversion machine/method, such as those disclosed in U.S. Pat. Nos. 3,509,798, 3,603,216, 3,655,500, 3,779,039, 4,026,198, 4,109,040, 4,717,613, 4,750,896, 5,134,013, 5,173,352, 5,188,581, 5,211,620, and 5,322,477 and also in pending U.S. patent application Ser. Nos. 07/840,306 abondoned and Ser. No. 07/861,225 abandoned.

With most, if not all, of the conversion machines/methods disclosed in the above-identified patents and applications, the cushioning product is created by converting multi-layer, and preferably three-layer, paper stock material into a desired geometry. The cushioning product includes pillow-like portions formed by the lateral edges of all of the layers of stock paper being rolled inwardly to form a pair of twin spirals. The central regions of this structure are then compressed and connected (such as by coining) to form a central compressed portion and two lateral pillow-like portions which essentially account for the cushioning qualitites of the product.

The central compressed portion of such a cushioning product is believed to be necessary to ensure that the pillow-like portions optimally maintain their cushioning qualities. In other words, without a connection of this type, the resiliency of the pillow-like portions would encourage the twin spirals to "unwind." However, the central portion, due to its compressed state, increases the density of the overall cushioning product.

In the past, attempts have been made to decrease the density of the cushioning products by altering its construction. Specifically, U.S. Pat. No. 4,717,613 introduced a conversion process/machine which creates a lower density cushioning product. The decrease in density is accomplished by urging the stock material outwardly into the pillow-like portions whereby the central compressed section is comprised of a lesser amount of stock material.

Despite past improvements, a need remains for paper cushioning products of even lower densities. Moreover, irrespective of particular density properties, environmental and other concerns provide a constant desire for new and effective paper cushioning products.

SUMMARY OF THE INVENTION

The present invention provides cushioning product comprising plural layers of a sheet-like stock material folded upon themselves to form a pillow-like portion. The lateral edges of the outer layer of the stock material are overlapped and connected together to maintain the geometry of the pillow-like portion. The lateral edges of the outer layers are connected together (for example, they are mechanically interlocked) separate from the central portion of the outer layer. Preferably, the stock material comprises layers of paper, more preferably biodegradable, recyclable and reusable paper, and even more preferably Kraft paper.

According to one preferred embodiment of the invention, the cushioning product includes a tab portion projecting from the pillow-like portion. The tab portion is formed from the overlapped edges of the outer layer and is preferably formed only from the overlapped edges of the outer layer. The pillow-like portion preferably includes a shell which surrounds its lateral sides and stuffing within the shell. The shell is formed from the outer layer and the stuffing is formed only from the remaining plies of stock material.

According to another preferred embodiment of the invention the overlapped lateral edges of the outer layer are generally coplanar with adjacent unoverlapped portions of the outer layer. The remaining inner layers of the stock material also have lateral edges overlapped and connected together with the overlapped lateral edges of the outer layer. The overlapped lateral edges of the inner layers are preferably connected together separate from their respective central portions.

These and other features of the invention are fully described and particularly pointed out in the claims. The following descriptive annexed drawings set forth in detail certain illustrative embodiments of the invention. These embodiments are indicative of but a few of the various ways in which the principles of the invention may be employed.

DETAILED DESCRIPTION OF THE INVENTION

Figure 1:
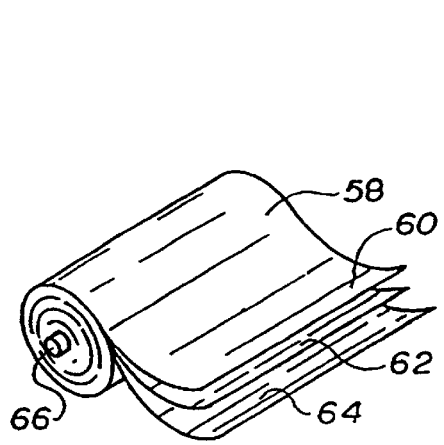
FIG. 1 is a perspective view of sheet-like stock material which may be used to produce a cushioning product according to the present invention.

A sheet-like stock material 58 which may be used to produce a cushioning product according to the present invention is shown in FIG. 1. The stock material 58 comprises three superimposed layers, namely an outer layer 60 and inner layers 62 and 64. These layers are preferably thirty inches wide, comprised of biodegradable, recyclable and reusable thirty-pound Kraft paper, rolled onto a hollow tube.

Figure 2:
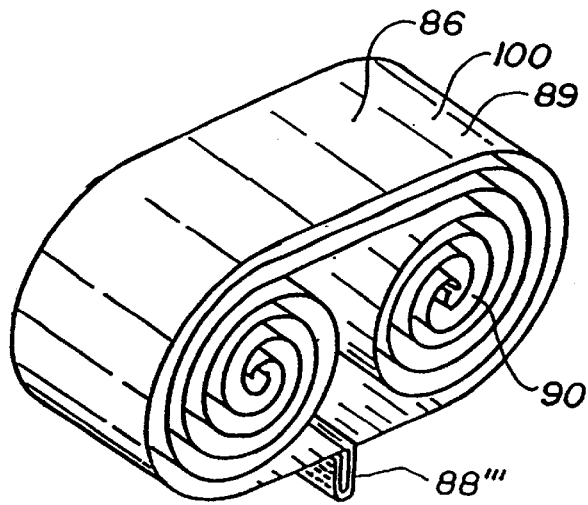
FIG. 2 is a perspective view of a cushioning product according to the present invention.

A cushioning product 100 according to the present invention is shown in FIG. 2. The cushioning product 100 may be made by the machine and/or method disclosed in U.S. Pat. No. 5,643,167, the entire disclosure of which is incorporated by reference. In this machine/method, the layers 60, 62 and 64 of the stock material are folded upon themselves to form a pillow-like portion 86. The lateral edges of the outer layer 60 of the stock material 58 are overlapped and connected together to maintain the geometry of the pillow-like portion 86. The lateral edges of the outer layer are connected together (specifically, they are mechanically interlocked) separate from the central portion of the outer layer 60 to form a tab portion 88''' projecting from the pillow-like portion 86. The pillow-like portion 86 includes a shell or casing 89 which surrounds its lateral sides and stuffing 90 within the shell. The shell 89 is formed from the outer layer 60 and the stuffing 90 is formed only from the remaining plies 62 and 64 of stock material 58.

Thus, the cushioning product 100 according to the present invention, is comprised of a stock material including at least a first layer and a second layer. The layers of the stock material form a pillow-like portion and at least one tab portion which projects from the pillow-like portion. The tab portion is connected whereby the pillow-like portion maintains its pillow-like geometry. Preferably, the stock material further comprises a third layer, and each of the layers is 30 inches wide, biodegradable, recyclable and reusable thirty-pound Kraft paper. The cushioning product preferably has a in the range of 0.30–0.50 pounds/foot$^3$ and more preferably approximately equal to 0.35–0.40 pounds/$ft$.

Figure 3:
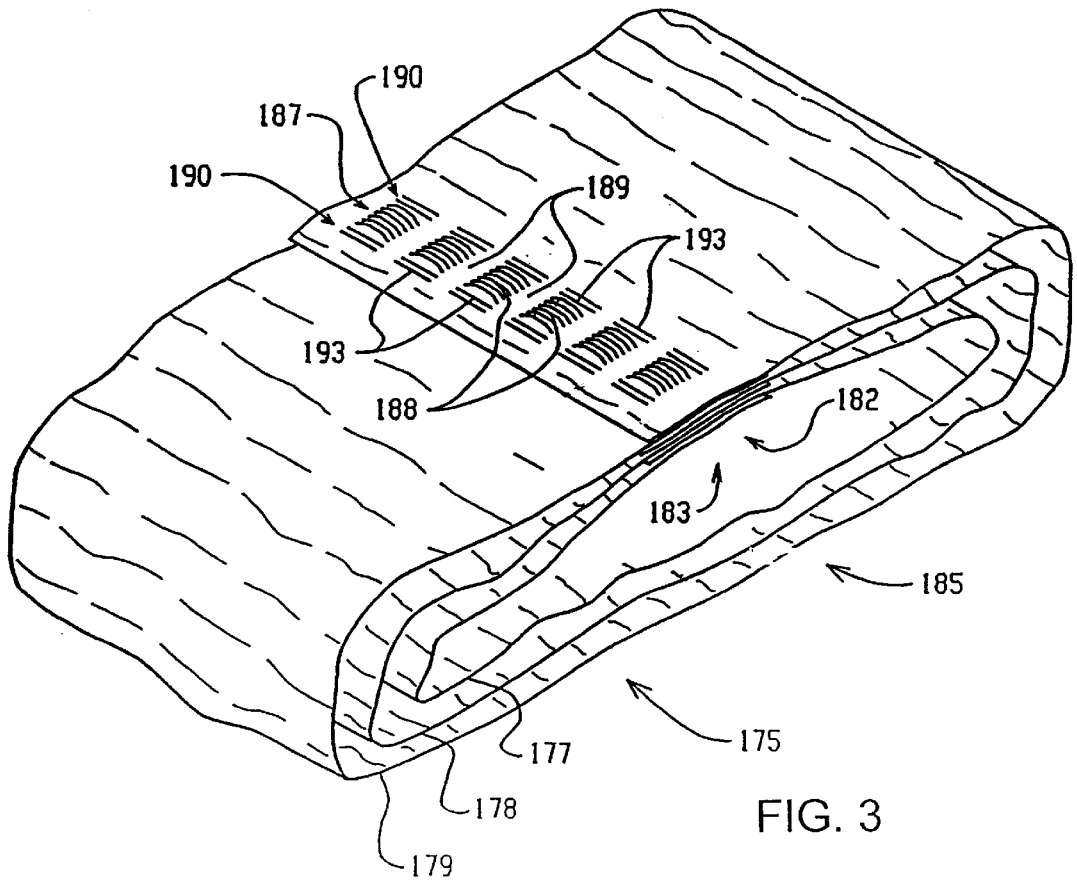
FIG. 3 is a perspective view of another cushioning product according to the present invention.

Another cushioning product 175 according to the present invention is shown in FIG. 3. The cushioning product 175 is preferably produced from stock material comprising at least two and preferably three or more superimposed layers which may be supplied in the form of a stock roll. These layers are each preferably twenty-seven to thirty inches wide and comprised of biodegradable, recyclable, and reusable thirty to fifty pound Kraft paper.

The cushioning product 175 may be made by the machine and/or method disclosed in U.S. patent application Ser. No. 08/487,012, now U.S. Pat. No. 5,755,656 the entire disclosure of which is hereby incorporated by reference. In this machine/method, the plural layers of the stock material are folded upon themselves to form a pillow-like portion. The lateral edges of the outer layer of the stock material are overlapped and connected together to maintain the geometry of the pillow-like portion. The lateral edges of the outer layers are connected together (specifically, they are coined or mechanically interlocked) separate from the central portion of the outer layer. The machine/method forms the stock material in such a manner that the overlapped lateral edges of the outer layer are generally coplanar with adjacent unoverlapped portions of the outer layer and so that the remaining inner layers of the stock material also have lateral edges overlapped and connected together with the overlapped lateral edges of the outer layer. The overlapped lateral edges of the inner layers are preferably connected together separate from their respective central portions.

Thus, the cushioning product 175 comprises at least two and preferably three, or more, layers 177–179 of sheet-like material having lateral edge portions thereof folded over the center portions and interleaved as seen at 182. The overlapped and interleaved lateral edge portions 182 are stitched together along a central seam or band 183 separate from the central portions 185 of the layers which are crumpled and provide loft to the cushioning product. The overlapped lateral edge portions 182 are generally coplanar with adjacent unoverlapped portions of the first layer, and the layers of stock material comprise biodegradable, recyclable and reusable Kraft paper as mentioned above.

One may now appreciate that the construction of a cushioning product according to the present invention is such that the product's overall density may be low while at the same time the integrity of the product's cushioning qualities are maintained. Accordingly, the present invention provides an environmentally responsible alternative to plastic packaging products.

Although the invention has been shown and described with respect to certain preferred embodiments, it is obvious that equivalent alterations and modifications will occur to others skilled in the art upon the reading and understanding of this specification. The present invention includes all such equivalent alterations and modifications and is limited only be the scope of the following claims.

What is claimed is:

1. A cushioning product comprising plural layers of sheet stock material folded upon themselves to form a pillow portion, at least the outer layer of said plural layers having lateral edges overlapped and connected together separate from a central portion of said outer layer to maintain the geometry of the pillow portion, said plural layers including at least three layers of sheet stock material; wherein the overlapped lateral edges extend in opposite directions.

2. A cushioning product as set forth in claim 1 wherein the plurality of layers of the sheet stock material comprise paper.

3. A cushioning product as set forth in claim 2 wherein the plurality of layers of the sheet stock material comprises biodegradable, recyclable and reusable paper.

4. A cushioning product as set forth in claim 2 wherein the plurality of layers of the sheet stock material comprise Kraft paper.

5. A cushioning product as set forth in claim 2 wherein the overlapped lateral edges of the outer layer are mechanically interlocked.

6. A cushioning product as set forth in claim 2 wherein the plurality of layers of paper are all of substantially the same width.

7. A cushioning product as set forth in claim 2 wherein the plurality layers of paper are all of substantially the same width.

8. A cushioning product as set forth in claim 1 wherein said product comprises a tab portion projecting from the pillow portion, the tab portion being formed from the overlapped edges of the outer layer.

9. A cushioning product as set forth in claim 8 wherein the tab portion is formed only from the overlapped edges of the outer layer.

10. A cushioning product as set forth in claim 9 wherein the plurality of layers of the sheet stock material comprise paper.

11. A cushioning product as set forth in claim 8, wherein the plurality of layers of paper are all of substantially the same width.

12. A cushioning product as set forth in claim 9 wherein the plurality layers of paper are all of substantially the same width.

13. A cushioning product as set forth in claim 9 wherein said pillow portion includes a shell which surrounds its lateral sides and stuffing within the shell and wherein the shell is formed from the outer layer and wherein the stuffing is formed only from the remaining plies of the stock material.

14. A cushioning product as set forth in claim 1 wherein said overlapped lateral edges of said outer layer are generally coplanar with adjacent unoverlapped portions of said outer layer.

15. A cushioning product as set forth in claim 14 wherein the plurality of layers of the sheet stock material comprise paper.

16. A cushioning product as set forth in claim 15 wherein the overlapped lateral edges of the outer layers are mechanically interlocked.

17. A cushioning product as set forth in claim 14 wherein the plurality layers of paper are all of substantially the same width.

18. A cushioning product as set forth in claim 14 wherein the remaining inner layers of the plural layers also having lateral edges overlapped and connected together with the overlapped lateral edges of the outer layer.

19. A cushioning product as set forth in claim 18 wherein overlapped lateral edges of the inner layers are connected together separate from their respective central portions.

20. A cushioning product as set forth in claim 18 wherein the plurality of layers of the sheet stock material comprise paper.

21. A cushioning product as set forth in claim 19 wherein the plurality of layers of paper are all of substantially the same width.

22. A cushioning product as set forth in claim 20 wherein the plurality layers of paper are all of substantially the same width.

23. A cushioning product as set forth in claim 14 wherein the remaining inner layers of the plural layers also having lateral edges overlapped and connected together separate from their respective central portions.

24. A cushioning product as set forth in claim 23 wherein the plurality of layers of the sheet stock material comprise paper.

25. A cushioning product as set forth in claim 19 wherein the plurality of layers of paper are all of substantially the same width.

26. A cushioning product as set forth in claim 24 wherein the plurality layers of paper are all of substantially the same width.

27. A cushioning product made from multiple plies of stock material, the product comprising a pillow portion having a shell which surrounds the lateral sides of the pillow portion and stuffing within the shell;

the shell being formed from certain plies of stock material; and the stuffing being formed only from remaining plies of stock material.

28. A cushioning product as set forth in claim 27 wherein the shell is formed from a single ply of stock material.

29. A cushioning product as set forth in claim 27 wherein the stuffing is formed from a plurality of plies of stock material.

30. A cushioning product a set forth in claim 28 wherein the stuffing is formed from a plurality of plies of stock material.

31. A cushioning product as set forth in claim 27 wherein the shell is formed from two plies of stock material.

* * * * *

UNITED STATES PATENT AND TRADEMARK OFFICE
CERTIFICATE OF CORRECTION

PATENT NO. : 6,132,842  
DATED : October 17, 2000  
INVENTOR(S) : James A. Simmons et al.

It is certified that error appears in the above-identified patent and that said Letters Patent is hereby corrected as shown below:

Column 4, claim 6,  
Lines 52-54, please delete.

Column 5, claim 11,  
Lines 1-3, please replace with -- 11. A cushioning product as set forth in claim 10 wherein the overlapped lateral edges of the outer layers are mechanically interlocked. --

Column 5, claim 21,  
Lines 36-38, please replace with -- 21. A cushioning product as set forth in claim 20 wherein the overlapped lateral edges of the outer layers are mechanically interlocked. --

Column 6, claim 25,  
Lines 11-13, please replace with -- 25. A cushioning product as set forth in claim 24 wherein the overlapped lateral edges of the outer layers are mechanically interlocked. --

Signed and Sealed this

Nineteenth Day of February, 2002

*Attest:*

JAMES E. ROGAN  
*Director of the United States Patent and Trademark Office*

*Attesting Officer*